(12) United States Patent
Lin

(10) Patent No.: US 6,375,499 B1
(45) Date of Patent: Apr. 23, 2002

(54) STRUCTURE OF A FOUR-LEGGED MOUNTING PEG FOR CONNECTION OF BOARDS

(76) Inventor: Li-Li Lin, P.O. Box 82-144, Taipei (TW)

(*) Notice: Subject to any disclaimer, the term of this patent is extended or adjusted under 35 U.S.C. 154(b) by 0 days.

(21) Appl. No.: 09/707,989

(22) Filed: Nov. 8, 2000

(51) Int. Cl.⁷ ........................ H01R 13/648; F16B 37/04
(52) U.S. Cl. ...................................... 439/573; 411/182
(58) Field of Search ........................... 439/573, 570, 439/564, 567; 411/182, 508, 85, 107

(56) References Cited

U.S. PATENT DOCUMENTS

| | | | | |
|---|---|---|---|---|
| 5,020,951 A | * | 6/1991 | Smith | 411/107 |
| 5,067,863 A | * | 11/1991 | Kowlaski | 411/85 |
| 5,211,521 A | * | 5/1993 | Page | 411/182 |
| 5,228,873 A | * | 7/1993 | Hirai | 439/573 |
| 5,694,719 A | * | 12/1997 | Bejune et al. | 411/182 |

* cited by examiner

*Primary Examiner*—Hian Vu
(74) *Attorney, Agent, or Firm*—A & J

(57) ABSTRACT

A structure of a four-legged mounting peg for connection of boards comprising a loose-proof ring, a T-shaped four-legged mounting peg mounting body having a top plate with a center screw hole, and a plurality of pointed discs, vertically extended from the top plate, characterized in that at least an upwardly protruded securing disc is provided on the top plate, closely adjacent to the screw hole to enclose the loose-proof ring, the protruded securing disc being bent inwardly towards the center screw hole and integrally formed as a unit with the peg body, thereby the mounting peg secures firmly onto the boards to mount the boards together without dislocation.

1 Claim, 2 Drawing Sheets

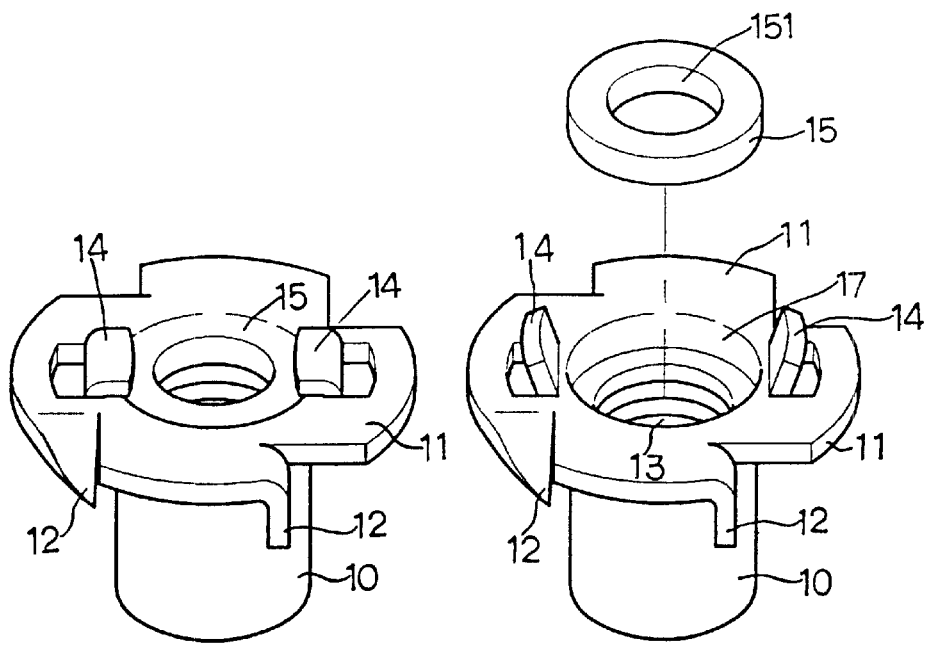
FIG. 2  FIG. 1
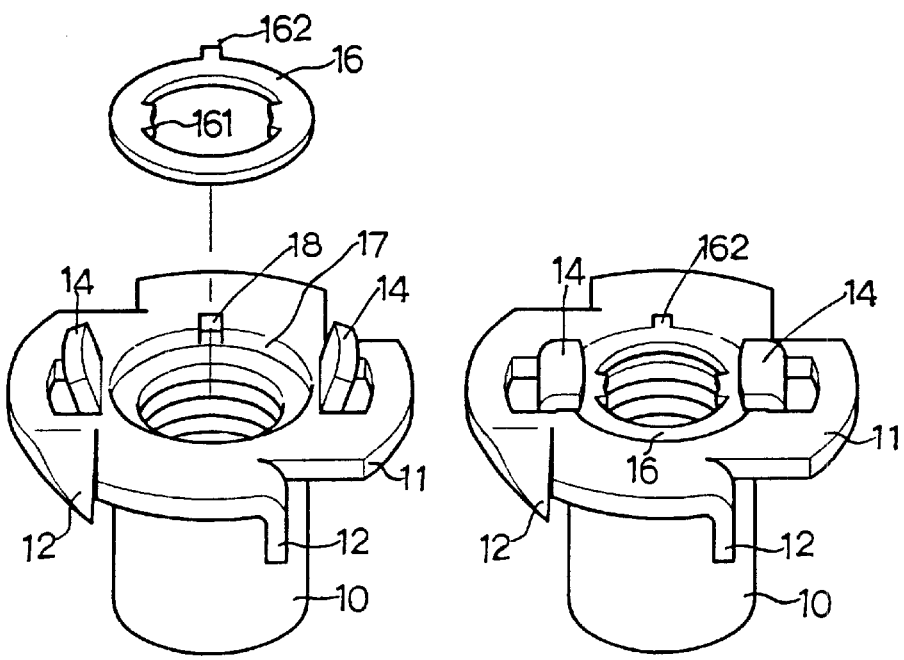
FIG. 5  FIG. 6

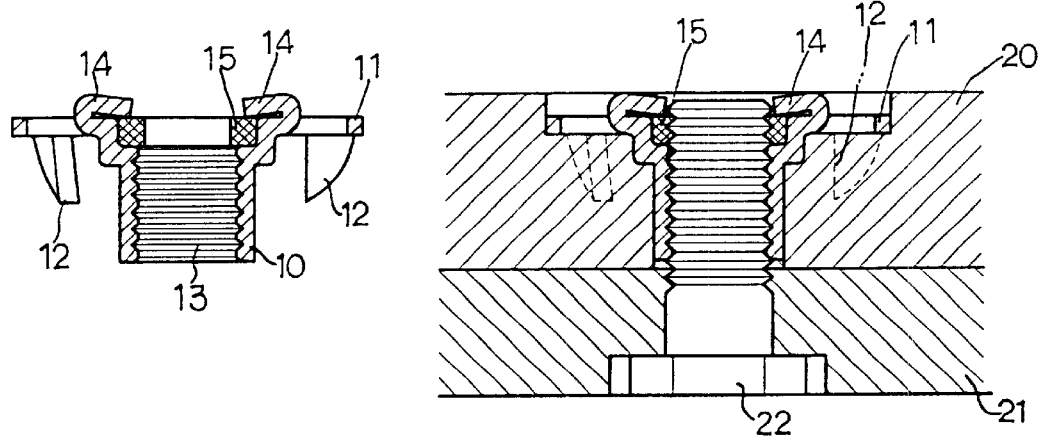
FIG. 4
FIG. 3
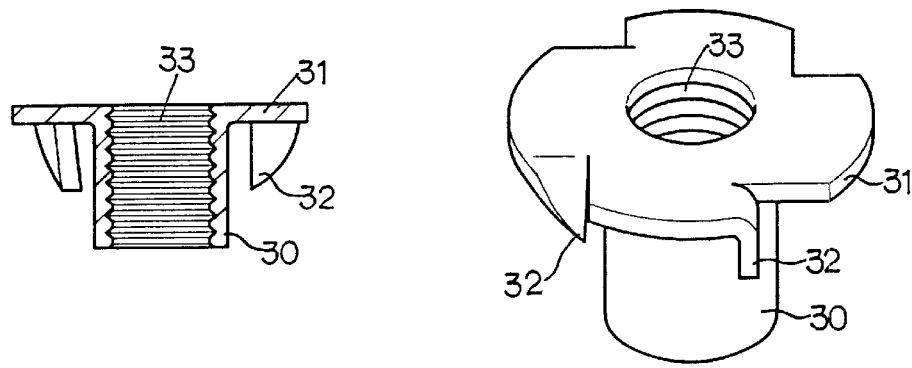
FIG. 8
FIG. 7

STRUCTURE OF A FOUR-LEGGED MOUNTING PEG FOR CONNECTION OF BOARDS

BACKGROUND OF THE INVENTION (a) Field of the Invention

The present invention relates to a structure of a four-legged mounting peg for connection of boards together, and in particular, a mounting peg being disposed into a board and secured by a loose-proof screwing element so as to ensure that the mounting peg has firmly secured the boards together without dislocation.

(b) Description of the Prior Art

Referring to FIGS. 7 and 8, there is shown a conventional T-shaped four-legged mounting peg body 30 having a center tube and a T-shaped top plate 31. A plurality of pointed discs 32 are mounted vertically downward from the top plate 31 to form into a four-legged peg for mounting onto a first board. The center tube forms into a screw hole 33 for the mounting with a screw rod through a second board. In order to mount the peg body 30 into the first board, the peg body 30 is disposed into a preset hole on the first board such that the pointed disc 32 is secured downward to the board. After the screw rod is secured with the peg body, the first and the second board are secured together.

In this conventional mounting peg, no loose-proof element is provided to the screw rod. Therefore, after the mounting peg has connected the two boards together, the connected boards may be dislocated if the boards are knocked or impacted by force. As a result, if this conventional mounting peg is used in mounting parts forming a furniture, the mounted parts of the furniture may swing randomly or the furniture is not stable, and the furniture is unsafe for use. In order to solve this drawback, some manufacturers may weld the mounting peg with the screw rod or may employ a powerful adhesive to glue the surfaces of the connecting parts, such as the two surfaces of the boards. However, the application of the welding process and the use of the adhesive causes an increase in the cost of production Besides, the adhesive may accidentally adhere onto the surface of the furniture, and the appearance of the new furniture has an unpleasant surface. Accordingly, the present invention is aimed to provide a mounting peg for connecting two boards or the like, having a loose-proof ring or disc to avoid dislocation of the connected boards.

SUMMARY OF THE INVENTION

One aspect of the present invention is to provide a structure of a four-legged mounting peg for connection of boards, comprising a loose-proof ring, a T-shaped four-legged mounting peg mounting body having a top plate with a center screw hole, and a plurality of pointed discs, vertically extended from the top plate, characterized in that at least an upwardly protruded securing disc is provided on the top plate, closely adjacent to the screw hole to enclose the loose-proof ring, which is mounted at the edge of the center screw hole, the protruded securing disc being bent inwardly towards the center screw- hole and integrally formed as a unit with the peg body, thereby the mounting peg secures firmly onto the boards to mount the boards together without dislocation.

Accordingly, it is an object of the present invention to provide a structure of a four-legged mounting peg for connection of boards, wherein the top plate edge of the body of the four-legged mounting peg is formed into a protruded securing disc during the process of manufacturing the mounting peg, and the securing disc being bent to secure the loose-proof ring such that upon securing of boards together, the loose-proof ring can be secured at the center screw hole.

Another object of the present invention is to provide a structure of a four-legged mounting peg for connection of boards, wherein the four-legged mounting peg solves the drawbacks of easy dislocation of mounted boards of the conventional type of mounting device.

Yet another object of the present invention is to provide a structure of a four-legged mounting peg for connection of boards, wherein the bending of the securing disc can position the loose-proof ring, which further prevents the mounting peg from loosening therefrom.

Yet another object of the present invention is to provide a structure of a four-legged mounting peg for connection of boards, wherein no supplemental tools are required in the process of mounting the peg together with the boards.

Other objects, advantages, and novel features of the invention will become more apparent from the following description when taken in conjunction with the accompanying drawings.

BRIEF DESCRIPTION OF THE DRAWINGS

FIG. 1 is a perspective exploded view of the structure of a four-legged mounting peg for connection of boards in accordance with the present invention.

FIG. 2 is an external view of the structure of a four-legged mounting peg for connection of boards in accordance with the present invention.

FIG. 3 is a sectional view showing the implementation of the structure of a four-legged mounting peg for connection of boards in accordance with the present invention.

FIG. 4 is a sectional view of the four-legged mounting peg in accordance with the present invention.

FIG. 5 is a perspective exploded view of the steel plate type of loose-proof ring together with the four-legged mounting peg in accordance with the present invention.

FIG. 6 is a perspective view of the four-legged mounting peg of FIG. 5 in accordance with the present invention.

FIG. 7 is a perspective view of a conventional four-legged mounting peg.

FIG. 8 is a sectional view of the conventional four-legged mounting peg in implementation

DETAILED DESCRIPTION OF THE PRESENT INVENTION

Referring to FIGS. 1–4, there is shown the structure of a four-legged mounting peg for connection of boards in accordance with the present invention. A T-shaped four-legged body 10 is provided with a T-shaped top plate 11 edge. In manufacturing, the edge of the top plate 11 is spaced apart with a plurality of pointed discs 12 facing perpendicularly downward On the surface of the spaced-apart region of the pointed disc on the top plate 11, close to the center screw hole 13, two or four protruded securing discs 14 are provided The securing discs 14 are inclined outward. The inner edge of the disc 14 is slightly larger than the diameter of the screw hole 13 for the mounting of a loose-proof ring 15, which can be a ring made from plastic or rubber material, or the ring is formed from a steel plate as the loose-proof disc 16, as shown in FIGS. 5 and 6. After the loose-proofing 15 has been mounted thereon, the protruded securing disc 14 is bent towards the center thereof to ensure that the loose-proof ring 15 or the loose-proof disc 16 is secured so as to facilitate the mounting procedure. In order to install the mounting peg body 10 into the board surfaces, the first board surface is provided with an extended hole. The top end of the center screw hole 13 has a plurality of staggered slots 17 being formed to accommodate the mounting of the entire loose-proof ring 15 to minimize the height of the securing disc 14 protruded out from the top plate 11. The center of the loose-proof ring 15 is provided with a through hole 151 so that it can be formed integrally with the body 10.

In accordance with the present invention, the four-legged mounting peg body 10 is mounted into a preset hole on the board 20, and another board 21 which is to be mounted together, is stacked onto the board 20 and a screw rod 22 is used to screw into the mounting peg body 10 from the external surface of the board 21. By means of the loose-proof ring 15 at the top end of the body 10, after the screw rod 22 has passed through the ring 15, the ring 15 enhances the locking effect of the screw rod 22. This further secures the mounting of the two boards 20, 21.

In accordance with the present invention, the loose-proof ring 15 may be replaced with a steel plate type of loose-proof disc 16, as shown in FIGS. 5 and 6. The protruded disc 161 at the center of the loose-proof disc 16 can reach the groove (threads) of the screw rod 20 to provide additional securing effect to the screw rod 22. In order to avoid the ring 16 from simultaneously rotate with the screw rod 22, a positioning slot 18 is formed at the top edge of the staggered slots 17 or at the edge of the screw hole 13 so that the protruded edge 162 at the loose-proof disc 16 can be engaged into the positioning slot 18. Accordingly, the structure of the four-legged mounting peg provides effective mounting of boards 20, 21 together, and the screw rod 22 is firmly secured by the loose-proof disc 116.

While this invention has been particularly shown and described with reference to, the preferred embodiment, it will be understood by those skilled in the art that various changes in form and details may be made without departing from the spirit and scope of this invention.

I claim:

1. A structure of a four-legged mounting peg for connection of boards comprising a loose-proof disk, a T-shaped four-legged mounting peg body having a top plate with a center screw hole, and a plurality of pointed discs, vertically extended from the top plate, wherein at least an upwardly protruded securing disc is provided on the top plate, closely adjacent to the screw hole to enclose the loose-proof ring, the protruded securing disc being bent inwardly towards the center screw hole and integrally formed as a unit with the peg body, thereby the mounting peg body secures firmly onto the boards to mount the boards together without dislocation, said loose-proof disc being used to engage with a screw rod to enhance firmed securing of boards together, a positioning slot being provided at edge of the center screw hole and a protruded disc being provided to the edge of the loose-proof disc corresponding to the positioning slot, thereby the protruded portion is engaged with the positioning slot and retains the loose-proof disc.

* * * * *